(12) United States Patent
Chu et al.

(10) Patent No.: US 8,542,683 B2
(45) Date of Patent: Sep. 24, 2013

(54) DYNAMIC BITLOADING

(75) Inventors: Kenneth Chu, San Diego, CA (US); Inderjit Singh, Ocean Beach, CA (US)

(73) Assignee: Entropic Communications, Inc., San Diego, CA (US)

(*) Notice: Subject to any disclaimer, the term of this patent is extended or adjusted under 35 U.S.C. 154(b) by 401 days.

(21) Appl. No.: 12/165,426

(22) Filed: Jun. 30, 2008

(65) Prior Publication Data

US 2009/0323684 A1    Dec. 31, 2009

(51) Int. Cl.
*H04L 12/56* (2006.01)

(52) U.S. Cl.
USPC ........................................................ 370/391

(58) Field of Classification Search
None
See application file for complete search history.

(56) References Cited

U.S. PATENT DOCUMENTS

| 5,719,854 | A | | 2/1998 | Choudhury et al. |
| 5,727,002 | A | * | 3/1998 | Miller et al. ................... 714/748 |
| 6,091,777 | A | * | 7/2000 | Guetz et al. ............... 375/240.11 |
| 6,483,870 | B1 | | 11/2002 | Locklear, Jr. et al. |
| 7,002,993 | B1 | * | 2/2006 | Mohaban et al. ............. 370/471 |
| 7,983,203 | B2 | * | 7/2011 | Kakani et al. ................. 370/311 |
| 2001/0025377 | A1 | | 9/2001 | Hinderks |
| 2004/0121749 | A1 | * | 6/2004 | Cui et al. .................... 455/226.1 |
| 2007/0195815 | A1 | * | 8/2007 | Turner et al. .................. 370/465 |
| 2009/0092154 | A1 | * | 4/2009 | Malik et al. ................... 370/480 |
| 2009/0175190 | A1 | * | 7/2009 | Lee et al. ...................... 370/253 |
| 2009/0257406 | A1 | * | 10/2009 | Sankar et al. ................. 370/336 |
| 2009/0258665 | A1 | * | 10/2009 | Bourlas et al. ................ 455/522 |

* cited by examiner

*Primary Examiner* — Yong Zhou
(74) *Attorney, Agent, or Firm* — Bruce Greenhaus; Richard Bachand; Sheppard, Mullins, Richter & Hampton LLP

(57) ABSTRACT

The subject matter disclosed herein relates to dynamically adjusting bitloading for multiple destinations on a network.

29 Claims, 3 Drawing Sheets

DYNAMIC BITLOADING

FIELD

The subject matter disclosed herein relates to dynamically adjusting bitloading for multiple destinations on a network.

BACKGROUND

As the popularity of multimedia has increased, the desire to distribute multimedia content, such as digital video, throughout a home or business using existing coaxial cable has also increased. One means for doing so is enabled by the use of devices developed, for example, according to the Multimedia over Coax Alliance (MoCA). Signals carrying multimedia content may enter a home or building at a point-of-entry (POE). From the POE, and within a home or building, such signals may be distributed to various terminals, or nodes that may be a part of a communication network, such as a broadband cable network (BCN), for example. Such terminals, clients, CPE'S, and/or clients, hereinafter referred to as clients, may be connected to, or included within, various entities, such as cable converter boxes, televisions, video monitors, cable modems, cable phones, and video game consoles, just to name a few examples.

As defined herein, the term "client" may be used interchangeably with the term "node", and the term "channel" may be used interchangeably with the term "link". Links, or channels, to clients may utilize signaling techniques such as a bitloaded modulation scheme. As defined herein, bitloading refers to a process of optimizing the modulation techniques used to carry data over a set a carriers on a link to a node to increase throughput. For example, some BCNs use bitloaded orthogonal frequency division multiplexing (OFDM). According to OFDM, the information is modulated on multiple carrier signals (typically 244 carriers, of which some or all may be modulated with information) with a variety of different modulation schemes on each individual carrier. For example, some of the carriers may be modulated with QAM 32, some with QAM 16, some with QAM 8, and some with BPSK (Binary Phase Shift Keying). Such a technique considers channel characteristics such as, for example, length, quality, channel connections, and/or any other features of a channel to a client that affects transmission of a message transmitting thereon. A modulation technique is chosen, for example, to provide an optimum rate of data transfer over a channel while maintaining an acceptable bit error rate. Symbols are transmitted downstream from over a channel via the 256 carriers (or some subset of them), each carrier transmitting bits according to a respective modulation, such as QAM 16, QAM 32, BPSK, and so on.

As noted above, different channels may utilize different bitloaded modulation schemes because the channels may have different physical and/or electrical properties. Physically, channels to different clients from a transmission source may vary in length and, electrically, such channels may vary because of the paths through and reflections from various elements, such as cables, switches, terminals, connections, and other electrical components in the network. Transmission characteristics of a channel may be described in terms of a signal-to-noise ratio (SNR), a bit-error rate (BER), and/or power level of a signal received at a client such as a remote device, for example.

In some BCNs, data may be transmitted on a network in the form of data packets, which includes a header, preamble, and a payload, for example. Such a header may include information regarding characteristics of the payload and the intended recipient. The information may include source and destination node identification, packet type and subtype, just to name a few examples. A preamble, may be used by the physical layer to detect and receive a packet.

Symbols represent one or more bits of data that make up a header, preamble, and/or payload in the packets to be transmitted. Both a header and a payload include information that is interpreted by an NC and/or a client. For a downstream packet, for example, a header includes information describing which client is an intended recipient of a corresponding payload. Such information may be read by a recipient client.

Additionally, an inter-frame gap (IFG) may exist between data packets. A header, preamble, and an IFG comprise an overhead portion of a data packet that may be combined with that of another data packet by aggregating data packets together. Data transmission efficiency, or throughput, may be improved by such aggregation since a relatively smaller portion of an aggregated data packet may be used for a preamble compared to that of a single data packet. Accordingly, the ratio of data (payload) to overhead may be increased.

A network coordinator, or network controller (NC), may be positioned either upstream or downstream of a POE. For example, in some BCNs an NC is included in "Headend" equipment that is considered to be upstream of a BCN. Such an NC coordinates upstream and downstream signals, such as data packets, from/to each channel of a BCN, for example. If downstream data packets, for instance, are intended for a single client, an NC aggregates such data packets to improve throughput. Downstream data packets, however, may not be aggregated if such downstream data packets are intended for multiple clients, since different clients will almost always have channels with different bitloading patterns.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
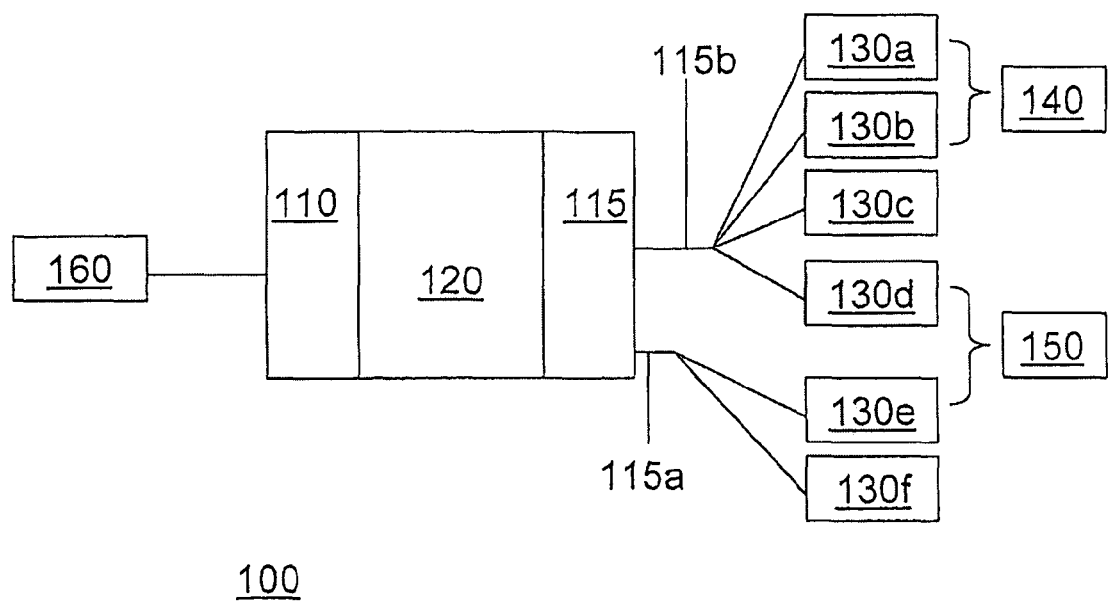
FIG. 1 is a schematic diagram illustrating a multicast network, according to an embodiment of the disclosed method and apparatus.

In the following detailed description, numerous specific details are set forth to provide a thorough understanding of claimed subject matter. However, it will be understood by those skilled in the art that claimed subject matter may be practiced without these specific details. In other instances, well-known methods, procedures, components, and/or circuits have not been described in detail so as not to obscure claimed subject matter.

In one embodiment of the disclosed method and apparatus, two or more clients are grouped together so that data packets intended for these clients can be aggregated. Multiple clients on a network then receive such an aggregated packet. Recipient clients then parse an aggregated packet to receive payload portions intended for the client, while ignoring payload portions intended for other clients. Such a process of aggregating packets intended for multiple clients on a network may improve throughput and efficiency for delivering packets to the clients.

In one embodiment, an NC associates multiple clients into an aggregation group (AG) depending on bitloading capabilities of channels to such clients. In another embodiment, multiple clients are associated into an AG depending on a traffic pattern of data packets that are to be transmitted. For example, data packets that are close together are better suited for aggregation so that data packet reordering and possible latency are minimized. An NC uses a transceiver (not shown) to transmit an aggregated packet downstream to an AG at a bitloading determined by a greatest common denominator (GCD) bitloading technique. Such a determination of GCD bitloading considers bitloading for individual carriers of channels to clients in the AG. An NC may set bitloading to be applied to such individual carriers for clients in the AG according to a bitloading capability of a worst-case for individual carriers of all associated carriers to clients in the AG. Such a bitloading capability of a worst-case carrier may be applied to multiple carriers to the clients in the AG. A bitloading profile of a channel to a client may be characterized by bitloading of individual carriers on the channel. Accordingly, GCD bitloading of an AG may include a bitloading capability profile comprising worst-case bitloading of each carrier across multiple channels to clients in the AG. In a particular embodiment, an NC considers a trade-off between benefits of aggregating packets and a GCD bitloading profile of an AG, explained as follows.

As mentioned above, aggregating packets may improve efficiency and throughput of data transmission on a network by decreasing size of overhead, such as a preamble and IFG, relative to payload data. But if such an aggregated packet is intended for two or more clients of an AG, a bitloading profile applied to all such clients may comprise worst-case bitloading capabilities of individual carriers on channels to clients of the AG if GCD bitloading is used. Accordingly, grouping clients in an AG may be risking a lower bitloading profile for all clients of the AG compared to sending non aggregated packets to all the clients separately. Accordingly, an NC may determine whether it is more beneficial to aggregate packets and create an AG to reduce packet overhead, which may involve a reduced bitloading profile, or to forego packet overhead reduction and send non aggregated packets to each client separately while applying individual bitloading capability profiles.

In an embodiment, an NC creates more than one AG by associating together clients having similar bitloading capability profiles into multiple AG's. Such a grouping process reduces throughput trade-offs of GCD bitloading for an AG, as described above. For example, an AG that includes clients having substantially equal bitloading capability profiles have a GCD bitloading profile that is not substantially lower than that of clients in the AG. In a more detailed example, an AG comprises clients that all have a bitloading capability profile of QAM 64 for carriers one through ten, QAM 32 for carriers eleven through twenty, and so on, so that a bitloading capability profile of every client in the AG is at least substantially the same. In other words, a bitloading profile of every client in the AG is the same. Accordingly, a GCD bitloading for the AG will also be the same.

In a particular embodiment, an NC includes a processor (not shown) to determine bitloading profiles of clients and to associate the clients together that do not have substantially equal bitloading profiles, but nevertheless fit within criteria that the NC uses while considering trade-offs in a multitude of grouping options. Accordingly, an NC may aggregate packets and choose criteria for creating multiple AG's depending on which combination of aggregated packets and AG's yield an optimum data throughput to clients of a network. In an alternative embodiment, the NC includes a memory (not shown) to aggregates packets. In determining which clients to group into an AG, an NC may consider overall data throughput resulting from an AG, not just GCD bitloading of the AG. In this way, as indicated above, clients of an AG may not necessarily all have substantially equal bitloading in order to improve efficiency by aggregating packets. Of course, such determinations of aggregation groups are only expressed above as examples of embodiments, and claimed subject matter is not so limited.

In an embodiment, an NC periodically reviews bitloading capabilities of channels to clients on a network. For example, such periodic review, or link maintenance operation (LMO), includes a round-robin determination of channels to check for changes in bitloading capability, such as a change in a bitloading profile across carriers on a channel. Such changes may result from physical changes to the network, such as temperature changes. In one example, an LMO occurs every approximately five minutes, though claimed subject matter is not limited to such an example. Bitloading is determined during LMO, for example, by sending a probe signal along a channel to each client, and measuring a response from associated clients. For example, to determine a bitloading from a client X to a client Y, a bitloading probe is sent from client X to client Y. Client Y then receives the probe and measure it's SNR for each carrier that it uses in an RF channel. The measured SNR determines the receive bitloading to use on client Y for transmissions from client X. Client Y then sends a report, which contains the bitloading, back to client X. Client X then uses the bitloading of the report as the transmit bitloading for transmissions for client X to client Y.

During an LMO cycle, an NC may consider removing or adding a client from/to an AG, depending on a newly determined bitloading capability of the client. For example, an NC removes a client from a particular AG if a bitloading capability of a channel to the client has changed since the last LMO cycle, since such changes may render the client outside AG bitloading parameters, as discussed above. An NC subsequently moves such a client into another AG which has corresponding bitloading parameters.

Referring to FIG. 1, a schematic diagram illustrates a network 100, such as a BCN, in accordance with particular embodiments. Network 100 includes an Access network and/or a Mesh network, for example. In one implementation, an Access network employs an NC 120 for inter-client communication, whereas a Mesh network allows one client to communicate directly with another client. NC 120 includes a transceiver (not shown) to receive information via communication port 110 from an upstream source, such as a router 160. Such information, which may be in packet form, may include video packets or program guide data (e.g., as in IPTV), just to name a few examples. In a particular embodiment, communication port 110 and/or NC 120 is positioned downstream of a POE (not shown) from router 160. In another embodiment, communication port 110 and/or NC 120 is positioned upstream of such a POE. NC 120 forwards at least a portion of such information via downstream (DS) port 115 to one or more connected clients 130a through 130f. In one embodiment, NC 120 receives data packets via coax cable and communication port 110 comprises a cable modem, for example. Communication port 110 is connected to and receives signals from one or more entities in addition to router 160. In one embodiment, router 160, NC 120, and clients 130 are part of a communication network.

DS ports 115a and 115b depict examples of connections between DS port 115 and downstream clients 130. Such connections may include a splitter network so that a packet may be passed downstream on a shared medium to multiple clients 130. In FIG. 1, clients 130a, 130b, 130c, and 130d are connected to DS port 115 via DS port 115b, and clients 130e and 130f are connected to DS port 115 via DS port 115a, although any number of clients may be connected to DS port 115 via any number of DS port connections and configurations. In a BCN, for example, the network is a shared medium so that multiple clients be connected to a single physical port. However, NC 120 may provision ports 115 as virtual ports from the single physical port. The number of clients 130 and the number and configuration of DS port connections depicted in FIG. 1 illustrates examples of various embodiments herein. In a particular embodiment, such a network as described above may be configured according to the Multimedia over Coax Alliance (MoCA, for example MoCA 1.1), though claimed subject matter is not limited to such examples.

In one embodiment, router 160 receives data traffic from an upstream video server (not shown) to provide data packets such as a multicast data stream onto a network 100, for example. In another embodiment, router 160 comprises a multi-port switch/router to receive data traffic from one or more servers, for example. Upon receiving such data traffic, router 160 subsequently routes traffic downstream onto network 100 to clients. For example, video data streams, such as high-definition television (HDTV) signals, are differentiated from each other by a group number included in an address, such as a MAC address. A data stream comprises, for example, MPEG video transmitted in internet protocol (IP) multicast packets, which make up the data stream. Clients downstream of router 160, including clients 130 downstream of NC 120, may include homes, businesses, or any POE on a network capable of receiving a data stream. NC 120 communicates with connected clients 130, though clients 130 may or may not be capable of communicating with one another.

In one embodiment, an AG includes clients having bitloading profiles that fall within bitloading value ranges for individual carriers. For example, referring to FIG. 1, an AG includes all or a portion of clients 130 that have associated bitloading profiles that fall within various ranges. To illustrate by example, clients 130c and 130f have associated bitloading profiles that fall outside a bitloading profile range and thus are not included in an AG; clients 130a and 130b are associated with bitloading profiles that fall within a first range and are thus included in a first AG 140; and clients 130d and 130e are associated with bitloading profiles that fall within a second range and are thus included in a second AG 150. Accordingly, packets are aggregated for transmission to clients 130a and 130b in the first AG, and other packets are aggregated for transmission to clients 130d and 130e in the second AG. Here, packets intended for clients 130c and 130f are not aggregated since they are not associated with any AG. Thus, NC 120 may determine how to aggregate packets based, at least in part, on which clients are grouped in which AG, for example. A bitloading applied in transmitting an aggregated packet to the first AG 140 may be the same bitloading as the GCD bitloading of the first AG, and bitloading applied in transmitting an aggregated packet to the second AG 150 may be the same bitloading as the GCD bitloading of the second AG, for example.

As discussed above, NC 120 may determine a single bitloading profile to be applied to each AG 140 and 150, which may be based, at least in part, on performance of channels to the clients included in each respective AG. For example, the bitloading profile applied to an AG comprises bitloading of individual carriers in channels of all clients in an AG that can be accommodated with an acceptable BER. For example, among clients included in an AG, one client has an associated channel having a lowest performance for a particular carrier, and this lowest performing channel may determine a bitloading for the particular carrier to be applied in forwarding aggregated packets to the particular carrier of all clients in the AG.

As discussed above, NC 120 may remove a client associated with an AG. This occurs in response to the client no longer having a bitloading profile that falls within criteria established for the AG, for example. Upon such an exit, performance of channels to clients in the AG is reassessed and a new bitloading value, which may be a GCD bitloading of the modified AG, then applies to forwarding aggregated packets to the clients of the modified AG. Such a reassessment depends upon whether such a modification would be negligible considering a difference in bitloading of the exiting client to that of the remaining clients, for example.

Figure 2:
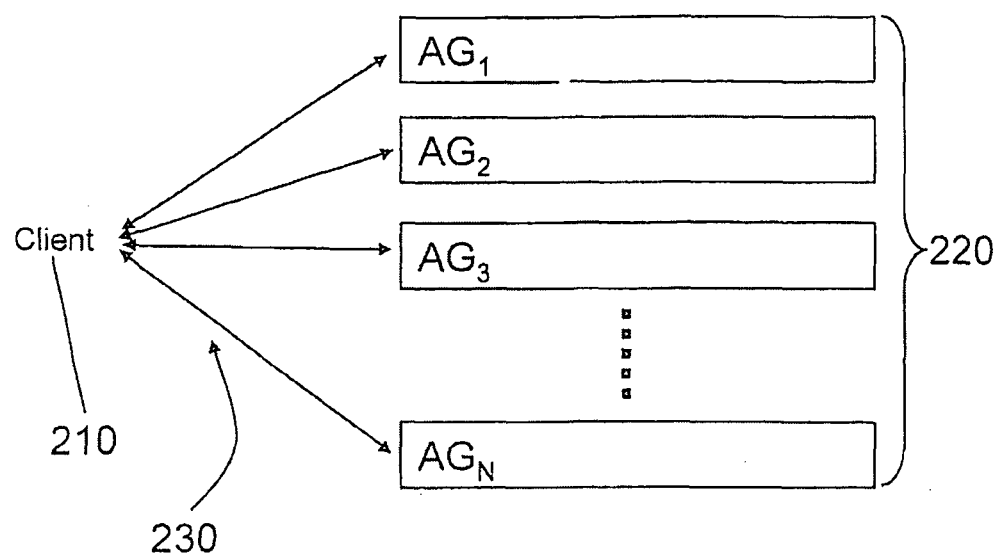
FIG. 2 is a schematic diagram illustrating a number of groups into which a client be placed, according to an embodiment of the disclosed method and apparatus.

FIG. 2 schematically illustrates choices that an NC, such as NC 120 shown in FIG. 1, have while determining in which AG of a plurality of AG's 220 to place a client 210. For example, $AG_1$ includes clients having a particular bitloading profile while $AG_2$ includes clients having another particular bitloading profile, and so on. In one embodiment, a client may be placed in multiple AG's: the more AG's that a client belongs to, the greater the possibilities of beneficial aggregation. Double-ended arrows 230 in FIG. 2 indicate that an NC may remove client 210 from any of AG's 220. Such removal may occur, for example, if changing physical behaviors of a network channel affect a bitloading for client 210 enough so that the changed bitloading falls outside a bitloading range of values for a particular AG. For example, subsequent to a change in bitloading, client 210 no longer "fits" in its original group $AG_2$. In such a case, NC 120 determines if another AG is suitable for client 210 with the client's new bitloading. For example, if the new bitloading falls within a range of values for another group $AG_1$, then NC 120 places client 210 into $AG_1$.

As mentioned above, NC 120 may determine whether to add or remove clients 210 of a network to/from AG's 220 after a periodic reassessment of network parameters, for example, during LMO. Such a determination of whether to add or remove clients also consider other factors in addition to whether a bitloading profile of a client has recently changed. For example, considering how much the bitloading profile has changed in relation to bitloading profiles of other clients in the AG's is such a factor. Consider, for example, a client with an associated bitloading that is outside the bitloading value range of an AG. In such a case, NC chooses not to remove the client from the AG if such a bitloading only corresponds to this client and perhaps less than a few others in the AG. In other words, the small number of such clients may not warrant moving clients from one AG to another. If, however, the NC determines that a relatively large number of clients in the AG have bitloading outside the bitloading value range of an AG, then the NC removes one or more of these clients from the AG. For example, NC may find a more appropriate AG for a client with faster bitloading, so that communication over a network benefits from the faster client channel.

Figure 3:
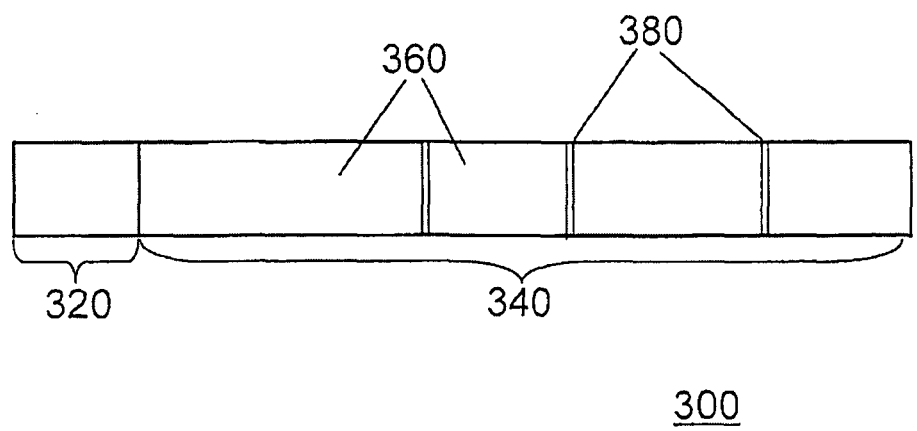
FIG. 3 is a schematic diagram illustrating components of a packet, according to an embodiment of the disclosed method and apparatus.

FIG. 3 is a schematic diagram illustrating components of an aggregated packet 300, according to an embodiment. As discussed above, aggregated packet 300 may include a header 320, hereinafter called an aggregation header, and a payload 340. Aggregation header 320 includes address information of clients for which payload 340 is intended, as well as other parameters, such as the number of protocol data units (PDU's), checksum, and length of each PDU, just to list a few examples. In one embodiment, there is one MoCA header in front of each aggregated data payload. Payload 340 includes a plurality of payload sections 360 intended for more than one client. Aggregated packet 300 is communicated over a network so that all clients receive the packet. Within payload 340, MoCA header 380 is included in payload 340 such as at front and/or back ends of payload sections 360. For example, MoCA header 380 may include transmit clock time, packet subtype, packet type, version, source node ID, destination node ID, packet length and header checksum, just to list a few examples. If a particular client receives aggregated packet 300, the client parses payload sections 360 that are intended for that client according to header information 380. Remaining payload sections 360 may be ignored by the particular client.

Figure 4:
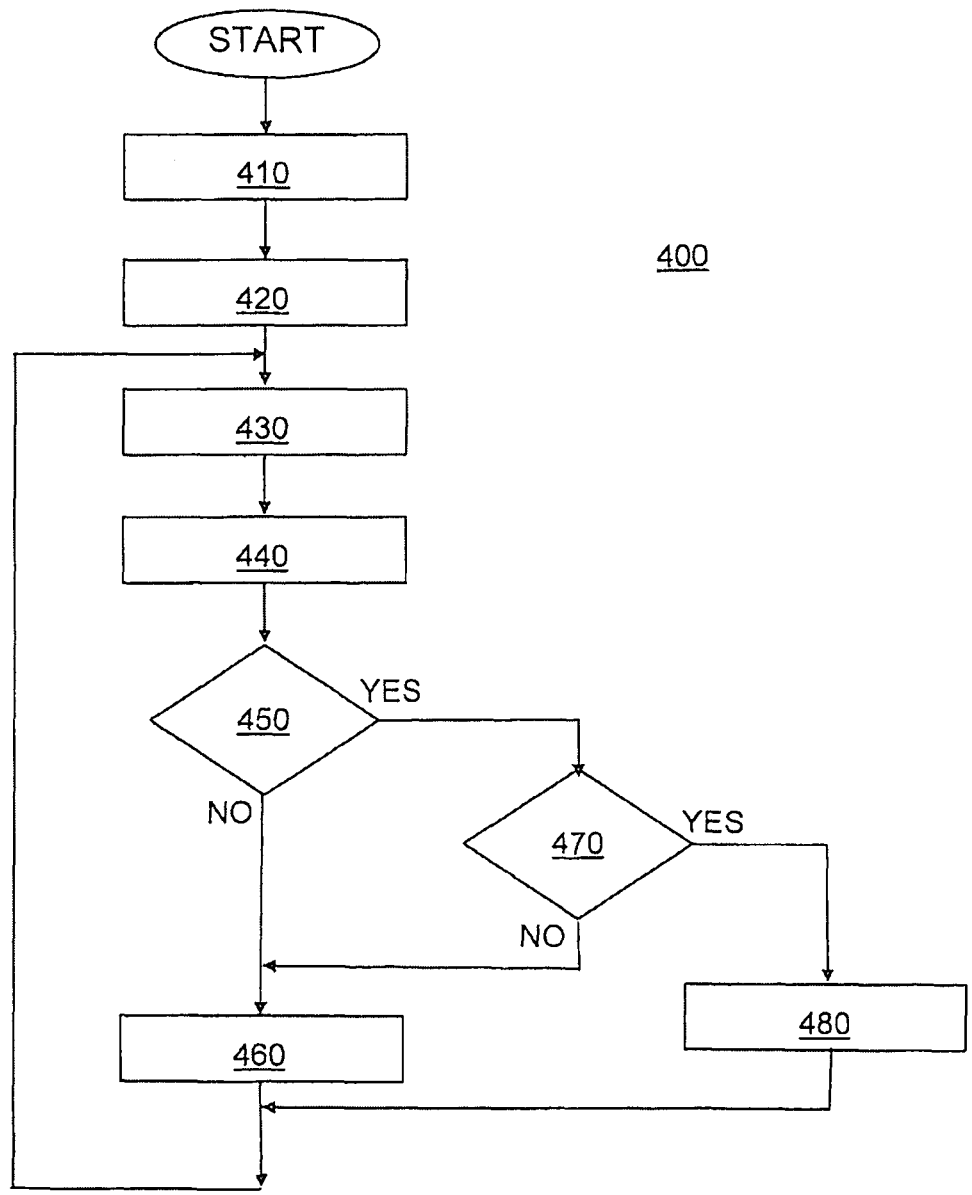
FIG. 4 is a flow diagram of a network controller process, according to an embodiment of the disclosed method and apparatus.

FIG. 4 is a flow diagram of a network controller process 400, according to an embodiment. Such a process may be repeated cyclically according to, for example, LMO cycle. At block 410, an NC, such as NC 120 shown in FIG. 1, determines a bitloading capability of channels to clients on a network. Such bitloading capability includes a bitloading profile across carriers for each client on the network. At block 420, the NC associates clients into a plurality of aggregation groups according to bitloading profiles of the clients. The NC considers which GCD bitloading for an AG result from such an association, as discussed above. Next, at block 430, considering the plurality of AG's, NC aggregates downstream packets according to which clients are in which AG, for example.

At block 440 the NC may reassess bitloading capability for each client on the network. Such a reassessment may be performed in association with LMO, as mentioned above, for example. At block 450, the NC determines whether bitloading has changed since the plurality of AG's were last created or modified. If a reassessment of client bitloading determines no substantial change, then the plurality of AG's is maintained at block 460. If, however, bitloading of one or more clients has changed, then the NC determines at block 470 whether such a change is enough to warrant modifying any of the plurality of AG's. In such a case, the plurality of AG's is maintained at block 460. On the other hand, the NC determines that a change in bitloading capabilities of one or more clients warrants a modification of one or more AG's. In such a case, at block 480, the NC adds or removes one or more clients to/from one or more AG's according to how new bitloading capabilities fit into respective AG's to optimize an increased throughput of aggregated packets to the downstream clients.

Some portions of the detailed description above are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of an execution device, such as a computing platform, a computer, or a similar electronic computing device, that manipulates and/or transforms data represented as physical electronic and/or magnetic quantities within the execution device's memories, registers, and/or other information storage, transmission, and/or display devices.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also include all aspects falling within the scope of appended claims, and equivalents thereof.

Though claims may include letters to delineate individual elements and/or process steps, such letters do not necessarily denote order or hierarchy of importance of any aspect of the claim language.

What is claimed is:

1. A method comprising:
   a) determining bitloading capability of a plurality of channels to clients by transmitting probes intended only for determining the characteristics of the channel and that do not have a payload intended to be received for its content;
   b) associating said clients into aggregation groups based at least in part on said bitloading capability; and
   c) aggregating information by combining the data portion of at least a first packet intended for a first client and not a second client, said first packet having a first overhead portion, with the data portion of at least a second packet intended for said second client and not said first client, said second packet having a second overhead portion different from said first overhead portion, while using an aggregation header comprising an address of said first client and an address of said second client, wherein the aggregated information for transmission to two or more of said clients is based at least in part on whether said clients are members of the same aggregation group, and wherein said aggregated information is performed by combining the data portion of the at least first packet sequentially with the data portion of the at least second packet, wherein each of the data portion of the at least first packet and the data portion of the at least second packet comprises a header, and wherein said aggregated information include data portions of packets intended only for clients in the same aggregation group.

2. The method of claim 1, wherein said aggregated information includes a data packet having a payload comprising information intended for transmission to said two or more clients.

3. The method of claim 1, further comprising adding one or more of said clients to one of said aggregation groups based at least in part on a reassessment of bitloading capability of respective channels associated with said one or more clients above a threshold.

4. The method of claim 1, further comprising:
a) removing one or more of said clients from one of said group based at least in part on a reassessment of bitloading capability of respective channels associated with said one or more clients below a threshold; and
b) including said one or more clients to another of said aggregation groups based on said reassessment of said bitloading capability.

5. The method of claim 1, wherein a size of said aggregated information is based, at least in part, on a greatest common denominator (GCD) bitloading of said same aggregation group.

6. The method of claim 1, further comprising:
a) reassessing said bitloading capability of said plurality of channels to clients; and
b) associating said clients into new aggregation groups based at least in part on the reassessed bitloading capability.

7. The method of claim 1, wherein a single bitloading is applied for all members of an aggregation group.

8. The method of claim 7, wherein said single bitloading is based at least in part on a greatest common denominator (GCD) bitloading of all members of said aggregation group.

9. An article comprising a storage medium comprising machine-readable instructions stored thereon which, if executed by an execution device, are adapted to direct said execution device to:
a) determine bitloading capability of a plurality of channels to clients;
b) associate said clients into aggregation groups based at least in part on said bitloading capability; and
c) aggregate information by combining the data portion of at least a first packet intended for a first client and not a second client, said first packet having a first overhead portion, with the data portion of at least a second packet intended for said second client and not said first client, said second packet having a second overhead portion different from said first overhead portion, while using an aggregation header comprising an address of said first client and an address of said second client, wherein the aggregated information for transmission to two or more of said clients is based at least in part on whether said clients are members of the same aggregation group, and wherein said aggregated information is performed by combining the data portion of the at least first packet sequentially with the data portion of the at least second packet, wherein each of the data portion of the at least first packet and the data portion of the at least second packet comprises a header, and wherein said aggregated information include data portions of packets intended only for clients in the same aggregation group.

10. The article of claim 9, wherein said aggregated information includes a data packet having a payload comprising information intended for transmission to said two or more clients.

11. The article of claim 9, wherein said instructions, if executed, are further adapted to direct said execution device to include one or more of said clients to one of said aggregation groups based at least in part on a reassessment of bitloading capability of respective channels associated with said one or more clients above a threshold.

12. The article of claim 9, wherein said instructions, if executed, are further adapted to direct said execution device to:
a) remove one or more of said clients from one of said group based at least in part on a reassessment of bitloading capability of respective channels associated with said one or more clients below a threshold; and
b) include said one or more clients to another of said aggregation groups based on said reassessment of said bitloading capability.

13. The article of claim 9, wherein a size of said aggregated information is based, at least in part, on a greatest common denominator (GCD) bitloading of said same aggregation group.

14. The article of claim 9, wherein said instructions, if executed, are further adapted to direct said execution device to:
a) reassess said bitloading capability of said plurality of channels to clients; and
b) associate said clients into new aggregation groups based at least in part on the reassessed bitloading capability.

15. The article of claim 9, wherein a single bitloading is applied for all members of an aggregation group.

16. The article of claim 15, wherein said single bitloading is based at least in part on a greatest common denominator (GCD) bitloading of all members of said aggregation group.

17. An apparatus comprising:
a) means for determining bitloading capability of a plurality of channels to clients by transmitting probes intended only for determining the characteristics of the channel and that do not have a payload intended to be received for its content;
b) means for associating said clients into aggregation groups based at least in part on said bitloading capability; and
c) means for aggregating information by combining the data portion of at least a first packet intended for a first client and not a second client, said first packet having a first overhead portion, with the data portion of at least a second packet intended for said second client and not said first client, said second packet having a second overhead portion different from said first overhead portion, while using an aggregation header comprising an address of said first client and an address of said second client, wherein the aggregated information for transmission to two or more of said clients is based at least in part on whether said clients are members of the same aggregation group, and wherein said aggregated information is performed by combining the data portion of the at least first packet sequentially with the data portion of the at least second packet, wherein each of the data portion of the at least first packet and the data portion of the at least second packet comprises a header, and wherein said aggregated information include data portions of packets intended only for clients in the same aggregation group.

18. The apparatus of claim 17, wherein said aggregated information includes a data packet having a payload comprising information intended for transmission to said two or more clients.

19. The apparatus of claim 17, further comprising adding one or more of said clients to one of said aggregation groups based at least in part on a reassessment of bitloading capability of respective channels associated with said one or more clients above a threshold.

20. The apparatus of claim 17, further comprising:
a) means for removing one or more of said clients from one of said group based at least in part on a reassessment of bitloading capability of respective channels associated with said one or more clients below a threshold; and
b) means for including said one or more clients to another of said aggregation groups based on said reassessment of said bitloading capability.

21. The apparatus of claim 17, wherein a size of said aggregated information is based, at least in part, on a greatest common denominator (GCD) bitloading of said same aggregation group.

22. The apparatus of claim 17, further comprising:
a) means for reassessing said bitloading capability of said plurality of channels to clients; and
b) means for associating said clients into new aggregation groups based at least in part on the reassessed bitloading capability.

23. The apparatus of claim 17, wherein a single bitloading is applied for all members of an aggregation group.

24. The apparatus of claim 23, wherein said single bitloading is based at least in part on a greatest common denominator (GCD) bitloading of all members of said aggregation group.

25. A network controller comprising:
a) a transceiver to receive data packets from a source and to forward the data packets to a plurality of clients;
b) a processor to determine bitloading capability of a plurality of channels to said clients and to associate said clients into aggregation groups based at least in part on said bitloading capability; and
c) a memory to aggregate information by combining the data portion of at least a first packet intended for a first client and not a second client, said first packet having a first overhead portion, with the data portion of at least a second packet intended for said second client and not said first client, said second packet having a second overhead portion different from said first overhead portion, while using an aggregation header comprising an address of said first client and an address of said second client, wherein the aggregated information for transmission to two or more of said clients is based at least in part on whether said clients are members of the same aggregation group, and wherein said aggregated information is performed by combining the data portion of the at least first packet sequentially with the data portion of the at least second packet, wherein each of the data portion of the at least first packet and the data portion of the at least second packet comprises a header, and wherein said aggregated information include data portions of packets intended only for clients in the same aggregation group.

26. The network controller of claim 25, wherein said aggregated information includes a data packet having a payload comprising information intended for transmission to said clients.

27. The network controller of claim 25, wherein a size of said aggregated information is based, at least in part, on a greatest common denominator (GCD) bitloading of said same aggregation group.

28. The network controller of claim 25, wherein a single bitloading is applied for all members of an aggregation group.

29. The network controller of claim 28, wherein said single bitloading is based at least in part on a greatest common denominator (GCD) bitloading of all members of said aggregation group.

* * * * *